(12) United States Patent
Ruffini et al.

(10) Patent No.: US 9,832,501 B2
(45) Date of Patent: Nov. 28, 2017

(54) VIDEO PROGRAMMING AND SUGGESTION SYSTEM

(71) Applicant: Verizon Patent and Licensing Inc., Basking Ridge, NJ (US)

(72) Inventors: Michael P. Ruffini, Methuen, MA (US); Lily F. Chen, Fort Lee, NJ (US); Joseph G. Fragale, Ridgewood, NJ (US); Dwight W. Fronsdahl, Groton, MA (US); Sankar Subramanian, Ossining, NY (US); Dale E. Veeneman, Southborough, MA (US); Dongchen Wang, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 87 days.

(21) Appl. No.: 14/034,884

(22) Filed: Sep. 24, 2013

(65) Prior Publication Data

US 2015/0089517 A1 Mar. 26, 2015

(51) Int. Cl.
*H04N 21/258* (2011.01)
*H04N 21/4788* (2011.01)
*H04N 21/482* (2011.01)

(52) U.S. Cl.
CPC ... *H04N 21/25891* (2013.01); *H04N 21/4788* (2013.01); *H04N 21/4826* (2013.01)

(58) Field of Classification Search
None
See application file for complete search history.

(56) References Cited

U.S. PATENT DOCUMENTS

| | | | |
|---|---|---|---|
| 6,704,931 B1* | 3/2004 | Schaffer et al. | 725/46 |
| 7,296,284 B1* | 11/2007 | Price et al. | 725/39 |
| 8,286,206 B1* | 10/2012 | Aaron et al. | 725/46 |
| 2003/0093793 A1* | 5/2003 | Gutta | 725/46 |
| 2003/0126600 A1* | 7/2003 | Heuvelman | H04N 5/44543 725/35 |
| 2005/0256756 A1* | 11/2005 | Lam | G06Q 30/02 705/7.33 |
| 2009/0154899 A1* | 6/2009 | Barrett | H04N 7/17318 386/293 |
| 2010/0287033 A1* | 11/2010 | Mathur | 705/10 |
| 2012/0124616 A1* | 5/2012 | Jeong | H04N 21/2347 725/31 |
| 2013/0173269 A1* | 7/2013 | Adler et al. | 704/251 |

* cited by examiner

Primary Examiner — Michael Telan

(57) ABSTRACT

A system may receive a first list of users of a provider network. For each of the first list of users, the system may obtain data pertaining to the user's categories of interest from a social media system; infer video programs based on the data; infer a list of one or more video channels based on the video programs; score the one or more video channels; rank the list of one or more video channels based on the scores; and recommend the ranked list of one or more video channels.

20 Claims, 7 Drawing Sheets

VIDEO PROGRAMMING AND SUGGESTION SYSTEM

BACKGROUND

With advances in information technology, consumers of content are given greater freedom to select particular programs or types of programs for viewing. For example, some consumers prefer to pay for specific video programs, rather than pay for bundled programs. Such consumers can subscribe to video-on-demand programs. Other users prefer to pay for viewing specific channels. A la carte programming may be appropriate for such viewers.

DETAILED DESCRIPTION

The following detailed description refers to the accompanying drawings. The same reference numbers in different drawings may identify the same or similar elements.

As used herein, the term "cloud" may refer to a network for providing hosted services over the Internet (or another network). The term "cloud computing" may refer to providing hosted services by the cloud. Cloud services are generally tailored to give the illusion of unlimited and ubiquitous resource availability. Services provided by a cloud may include a Software-as-a-Service (SaaS), Platform-as-a-Service (PaaS), Infrastructure-as-a-Service (IaaS), and Network as a Service (NaaS).

As used herein, the term "video program" may include video content provided over any known distribution medium, such as satellite, cable, optical fibers, terrestrial broadcasting medium, etc. Such a program may include live or pre-recorded program, a movie, an on-demand program, etc. As used herein, the term "video channel" may include a channel that provides one or more video programs.

As described below, a system may use cloud analysis, business intelligence, customer viewing history, and social media information in providing content to customers. For example, the system may use information provided by a social media system, a user's viewing history, and the user's downloads/recordings to identify a list of channels that the user may wish to view. The system may present the user with the list, from which the user may select one for viewing, or from which the user may order a subset of channels for a la carte programming. By identifying a list of contents/channels that may arouse or match the user's interest and by presenting the list to the user, the system may save the user from having to navigate a large number of channels and programs to discover content items/channels for viewing or subscription.

Figure 1:
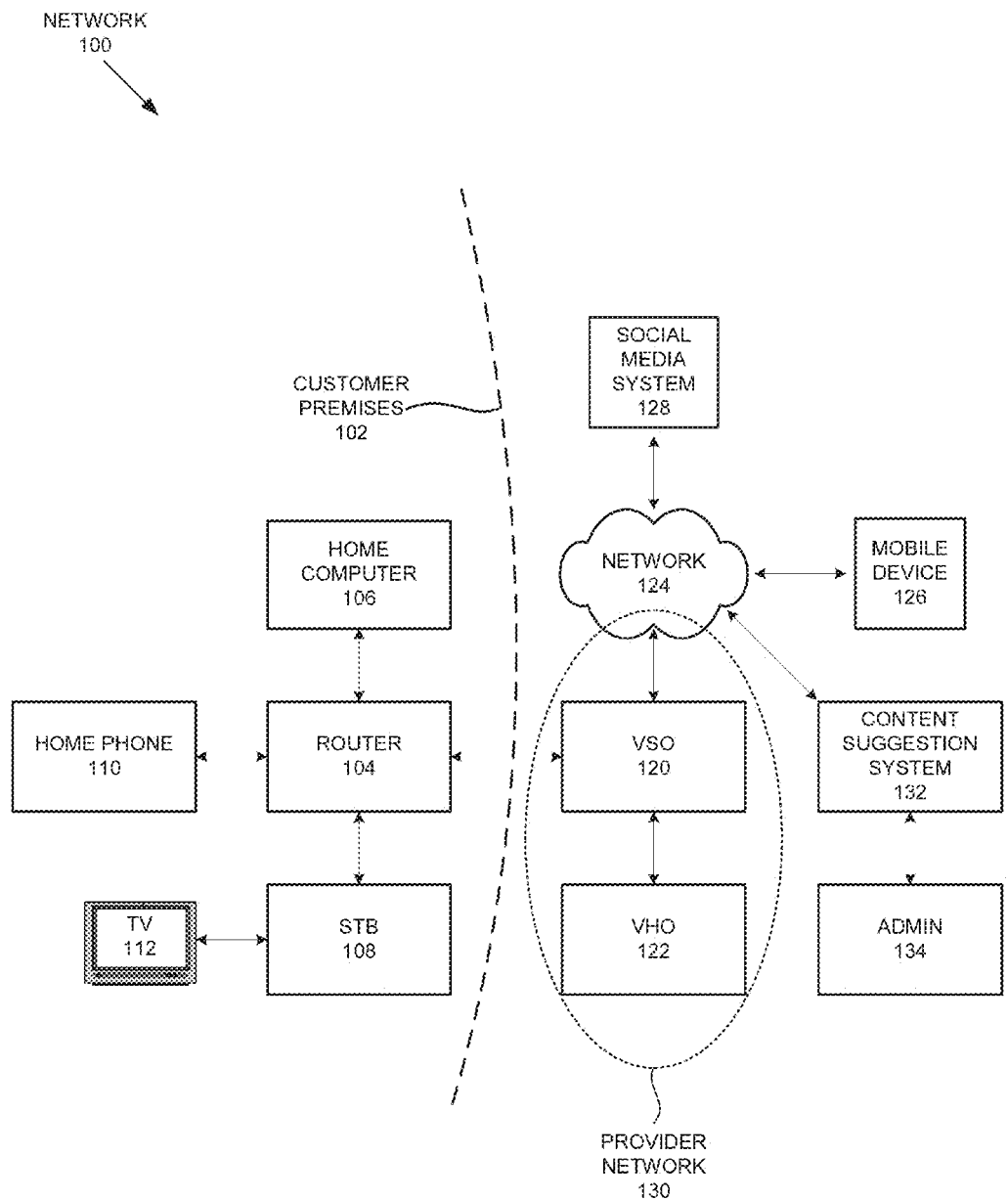
FIG. 1 is a diagram of an exemplary network in which a content suggestion system may be implemented.

FIG. 1 illustrates an exemplary network 100 in which a content suggestion system may be implemented. As shown, network 100 may include a customer premises 102, video service office (VSO) 120, video hub office (VHO), network 124, mobile device 126, social media system 128, content suggestion system 132, and an administration device 134.

Customer premises 102 may include a location at which one or more user devices reside. For example, customer premises 102 may include an office, an apartment, a house, etc. As further shown in FIG. 1, a typical customer premises 102 may include a router 104, home computer 106, set-top box 108, home phone, and television 112. Devices in customer premises 102, such as home computer 106, set-top box 108, home phone 110, and television 112 may each be considered a "user device."

Router 104 may receive data and may transfer the data to the appropriate device in customer premises 102, such as computer 106 or set-top box 108. Likewise, router 104 may receive data from any device in customer premises 102 and may transmit the data to other devices in network 100. Router 104 may provide customer premises 102 with Internet access, television access, or telephone service, for example. Computer 106 may include a laptop, a desktop, a mobile telephone, a personal digital assistant (PDA), or another portable communication device.

Set-top box 108 may receive content and output the content to television 112 for display. Set-top box 108 may include a component (e.g., a cable card or a software application) that plugs into a host device (e.g., a personal computer, television 112, a stereo system, etc.) that allows the host device to display content. Home phone 110 may include a plain old telephone system (POTS) device, a wireless telephone, a soft phone (e.g., Voice-over-Internet Protocol (IP) (VoIP) phone), etc. Television 112 may include speakers as well as a display. Television 112 may play content, for example, received from set-top box 108.

Depending on the embodiment, customer premises 102 may include additional, fewer, different, and/or different arrangement of devices than those illustrated in FIG. 1. For example, customer premises 102 may include additional computers 106, set-top boxes 108, and televisions 112. Furthermore, although not illustrated, customer premises 102 may include other devices, such as optical network terminal (ONT), switches, bridges, and/or other network components.

VSO 120 may deliver content to customer premises 102 and may receive data from customer premises 102 for forwarding to the proper destination (e.g., VHO 122). VSO 120 may include a content server for transcoding and multiplexing content from different sources for delivery to customer premises 120. VHO 122 may provide on-demand content or may serve and manage interactive content (e.g., a form of content with which a user can interact).

Network 124 may include one or more packet switched networks, such as an Internet protocol (IP) based network, a local area network (LAN), a wide area network (WAN), a personal area network (PAN), an intranet, the Internet, a cellular network, a fiber-optic network, or another type of network that is capable of conveying data. Network 124 may also include a circuit-switched network, such as a public-switched telephone network (PSTN) for providing telephone services for traditional telephones. For example, network 124 may include a service provider network, which in turn includes Signaling System No. 7 (SS7) network, a Session Initiation Protocol (SIP) network, etc. Network 124, in conjunction with components in VSO 120, may allow devices at customer premises 102 (e.g., computer 106 or set-top box 108) to connect to other devices also attached to network 124, such as third party web site servers (not shown) or other customers (not shown).

Mobile device 126 may include a radiotelephone, a personal communications system (PCS) terminal, a personal digital assistant (PDA), a laptop, or another portable communication device. Mobile device 126 may communicate with other devices via one or more communication towers (not shown) using a wireless communication protocol, e.g., GSM (Global System for Mobile Communications), CDMA (Code-Division Multiple Access), WCDMA (Wideband CDMA), IEEE 802.11x, etc. Mobile device 126 may be associated with a phone number. Like the devices in customer premises 102, mobile device 126 may also be considered a "user device."

Social media system 128 may provide platform and infrastructure for users to create, share, and/or exchange information. A user of social media system 128, for example, may: upload pictures (e.g., via a browser); share the pictures with family members and friends; post the user's likes and dislikes regarding books, television shows, movies, music (e.g., pop songs), plays, restaurants; etc.

In some implementations, social media system 128 may collect information that its users or members provide. Social media system 128 may allow a third party to access such information, for example, for a fee. Such a third party may obtain the information from social media system 128 via a set of remote application programming interfaces (APIs) provided by social media system 128. Alternatively, or additionally, social media system 128 may forward collected information to the third party.

Content suggestion system 132 may collect information from social media system 128 and provider network 130. The information from provider network 130 may include cloud data (e.g., amount of data uploaded/downloaded in a period of time), what content the user downloaded or uploaded, business intelligence (e.g., what content the user purchased), user's presence information, user's viewing history (e.g., what movies/television shows the user viewed), what movies/programs are stored at the user's set-top box, etc. The information from social media system 128 may include, for example, indications of user's likes or dislikes and a list of user's friends and family members.

Content suggestion system 132 may use the information to determine a list of content items and/or channels that the user may wish to view. Content suggestion system 132 may present the user with the list, for example, via VSO 120, router 104, set-top box 108, and television 112. In response, the user may select one or more of the channels in the list for a la carte programming. Alternatively or additionally, the user may select one or more of the channels/content items for viewing or recording.

Administration device 134 may receive commands for viewing alarms, system analytics, problem reports, device parameters, system configuration parameters, etc. that are useful and/or necessary for administration of content suggestion system 132. In addition, administration device 134 may allow system administrators/operators to configure content suggestion system 132. For example, via administration device 134, an administrator may select a particular types of media (e.g., books) and/or user interest (e.g., type of music, wine, architecture, theater, dining, etc.) for which content suggestion system 132 may collect data/information from social media system 128.

In FIG. 1, VSO 120, VHO 122, and a portion of network 124 may form a provider network 130. The provider network may provide one or more communication services to customers, such as the Internet service, content service, cloud service (e.g., NaaS, IaaS, SaaS, etc.), communication service (e.g., telephone service, texting service, etc.).

In FIG. 1, exemplary devices and networks are illustrated for simplicity. Network 100 may include more devices, fewer devices, different devices, and/pr a different arrangement of devices than those illustrated in FIG. 1. For example, network 100 may include thousands or millions of customer premises 102, hundreds of VSOs 120, and multiple social media systems 128.

In some embodiments, the functions performed by two or more devices in network 100 may be performed by any one device. Likewise, in some embodiments, the functions performed by any one device may be performed by multiple devices. Furthermore, the connections shown in FIG. 1 are exemplary. In other embodiments, additional connections that are not shown in FIG. 1 may exist between devices (e.g., each device may be connected to every other device). The connections in FIG. 1 may also be wireless or wired.

Figure 2:
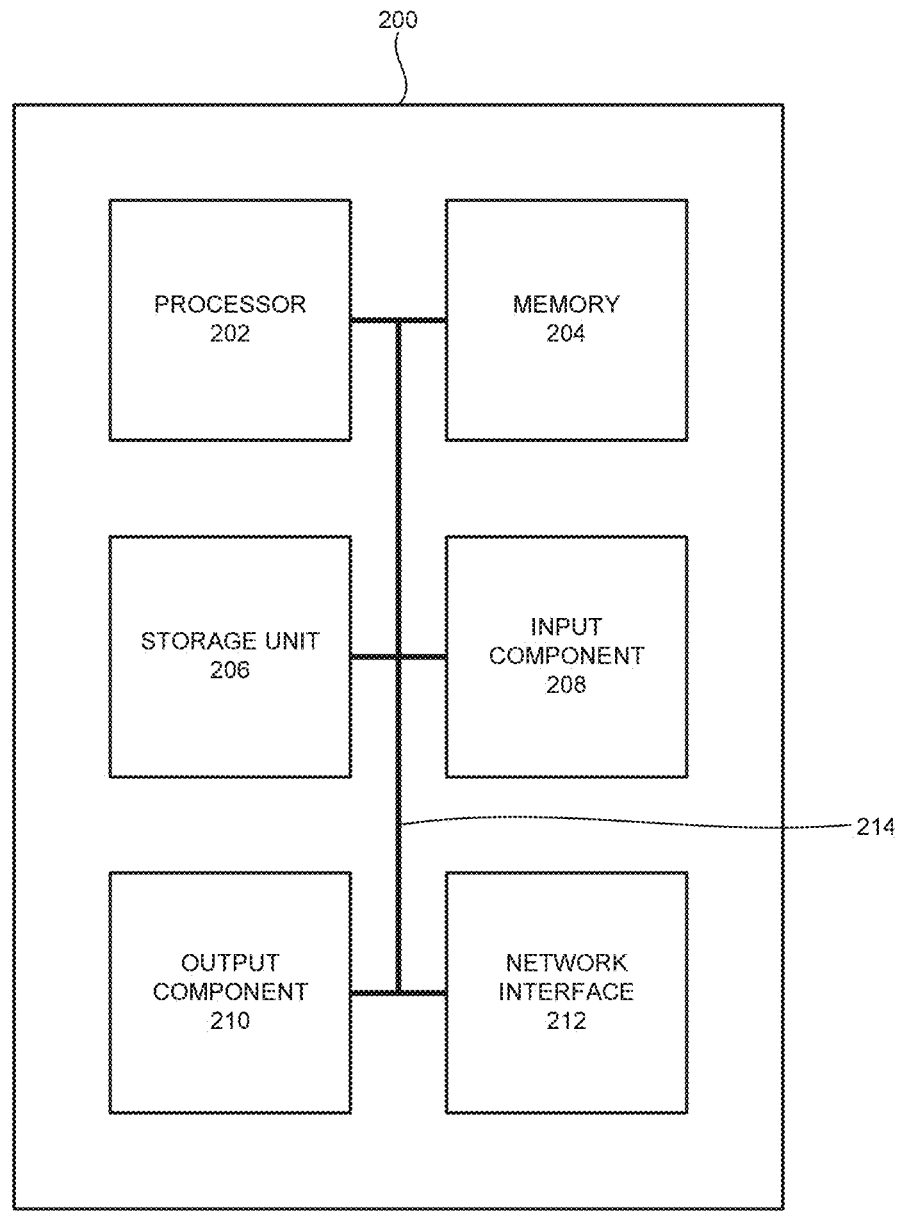
FIG. 2 is a block diagram of exemplary components of an exemplary network device of FIG. 1.

FIG. 2 is a block diagram of an exemplary network device 200, which may correspond to one or more of devices in network 100 (e.g., router 104; home computer 106; set-top box 108; phone 110; television 112; administration device 134; one or more devices in VSO 120, VHO 122, network 124, system 128, and system 132; mobile device 126; etc.). As shown, network device 200 may include a processor 202, memory 204, storage unit 206, input component 208, output component 210, network interface 212, and communication path 214. In different implementations, network device 200 may include additional, fewer, different, or a different arrangement of components than the ones illustrated in FIG. 2. For example, network device 200 may include line cards for connecting to external buses.

Processor 202 may include a processor, a microprocessor, an Application Specific Integrated Circuit (ASIC), a Field Programmable Gate Array (FPGA), and/or other processing logic (e.g., embedded devices) capable of controlling network device 200. Memory 204 may include static memory, such as read only memory (ROM), and/or dynamic memory, such as random access memory (RAM), or onboard cache, for storing data and machine-readable instructions (e.g., programs, scripts, etc.). Storage unit 206 may include a floppy disk, CD ROM, CD read/write (R/W) disc, and/or flash memory, as well as other types of storage devices (e.g., hard disk drive) for storing data and/or machine-readable instructions (e.g., a program, script, etc.). As used herein, the terms "computer readable storage medium" and "computer-readable storage device" may be used synonymously, and may refer to memory 204 and/or storage unit 206.

Input component 208 and output component 210 may provide input and output from/to a user to/from network device 200. Input/output components 208 and 210 may include a display screen, a keyboard, a mouse, a speaker, a microphone, a camera, a DVD reader, Universal Serial Bus (USB) lines, and/or other types of components for converting physical events or phenomena to and/or from signals that pertain to network device 200.

Network interface 212 may include a transceiver (e.g., a transmitter and a receiver) for device 200 to communicate with other devices and/or systems. For example, via network interface 212, network device 200 may communicate over a network, such as the Internet, an intranet, a terrestrial wireless network (e.g., a WLAN, WiFi, WiMax, etc.), a satellite-based network, optical network, etc. Network interface 212 may include a modem, an Ethernet interface to a LAN, and/or an interface/connection for connecting network device 200 to other devices (e.g., a Bluetooth interface).

Communication path 214 may provide an interface through which components of network device 200 can communicate with one another.

Network device 200 may perform the operations described herein in response to processor 202 executing software instructions stored in a non-transient computer-readable medium, such as memory 204 or storage unit 206. The software instructions may be read into memory 204 from another computer-readable medium or from another device via network interface 212. The software instructions stored in memory 204 or storage unit 206, when executed by processor 202, may cause processor 202 to perform processes that are described herein.

Figure 3:
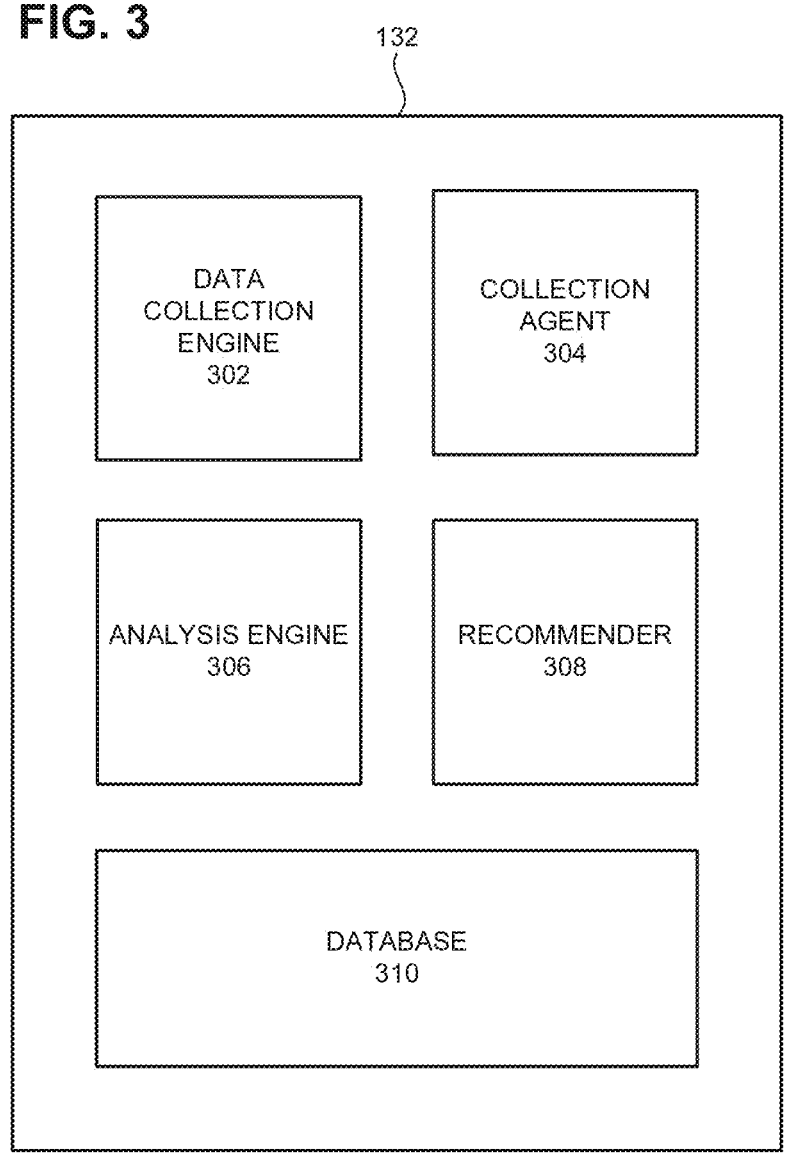
FIG. 3 is a block diagram of exemplary functional components of the content suggestion system of FIG. 1.

FIG. 3 is a block diagram of exemplary functional components of content suggestion system 132. As shown, system 132 may include a data collection engine 302, collection agent 304, analysis engine 306, recommender 308, and database 310.

Data collection engine 302 may collect data/information from social media system 128 and provider network 130. For example, in one implementation, data collection engine 302 may invoke one or more sets of APIs to obtain, from provider network 130, a list of users for whom content suggestion system 132 is to generate content/channel recommendations. Based on the list of users, data collection engine 302 may collect, from social media system 128, information/data about users, in the list of users, that are also members of social media system 128. These users, that are both members of social media system 128 and customers of provider network 130, may be a subset of the list of users.

After data collection engine 302 obtains the user information/data from social media system 128 for the subset of users, data collection engine 302 may traverse a relationship tree for each of the subset of users (e.g., a tree of relationship with the user at the root of the tree) in social media system 128. As data collection engine 302 traverses each tree, data collection engine 302 may obtain information/data about the user's friends or family members. Depending on one or more parameters that are set via administration device 134, data collection engine 302 may limit the traversal of each relationship tree (e.g., the maximum number of nodes, in a tree, that data collection engine 302 is allowed to visit; the maximum degree of separation between the user and a node that can be visited, etc.).

Data collection engine 302 may also collect data/information from provider network 130. Data collection engine 302 may obtain, for example, purchase history (e.g., what content item/channels a user purchased and/or subscribed to, viewing history (e.g., what movies or television shows that the user viewed at what time, etc.), information obtained from user communications (e.g., email messages, voice mail, text messages, etc.), DVR history, etc. Some of the information may be obtained by tracking mobile device 126, set-top box 108, cloud usage, VSO 120, VHO 122, etc. Data collection engine 302 may store the collected data/information in database 310.

Collection agent 304 may operate alternatively or in addition to data collection engine 302, to collect user data/information from social media system 128. Collection agent 304 may log into social media system 128 with a set of user credentials and collect data/information from social media system 128. For each user in the list of users, from provider network 130, collection agent 304 may collect data/information similar to the data/information that can/may be collected by data collection engine 302. Furthermore, like data collection engine 302, collection agent 3-4 may traverse, for each user, the user's relationship tree to collect data/information about the user's friends and family members. Collection agent 304 may store any information that it collects in database 310.

Analysis engine 306 may use the data/information collected by data collection engine 302 and/or collection agent 306 to generate or identify a list of content items/channels that system 132 may recommend to users. Analysis engine 306 is further described below with respect to FIG. 6.

Recommender 308 may receive a ranked list of content items and/or channels from analysis engine 306. Recommender 308 may then communicate the ranked list to one or more of the following devices or systems: VSO 120, social media system 128, devices/servers that provide content recommendations (e.g., devices in provider network 130), mobile device 126, administration device 134, home computer 106, and set-top box 108. Recommender 308 may send the ranked list in a form appropriate for the recipient device, for example, as a text file, eXtensible Markup Language (XML) file, Hypertext Markup Language (HTML) file, or another type of file.

Database 310 may receive and store data/information collected by data collection engine 302 and collection agent 304 (e.g., data/information from social media system 128 and provider network 130). In addition, database 310 may provide the stored data/information to analysis engine 306, and receive/store results of analyses from analysis engine 306. Database 310 may also store and/or retrieve reports, recommended content/channel lists, etc.

Depending on the implementation, content suggestion system 132 may include additional, fewer, different, or differently arranged components than those illustrated in FIG. 3. For example, in one implementation, content suggestion system 132 may include multiple instances of data collection engine 302, collection agent 304, analysis engine 306, recommender 308, and database 310. For example, multiple instances of collection agents 304 executing on multiple devices and/or processors may log into social media system 128 and collect data/information about different users.

Figure 4:
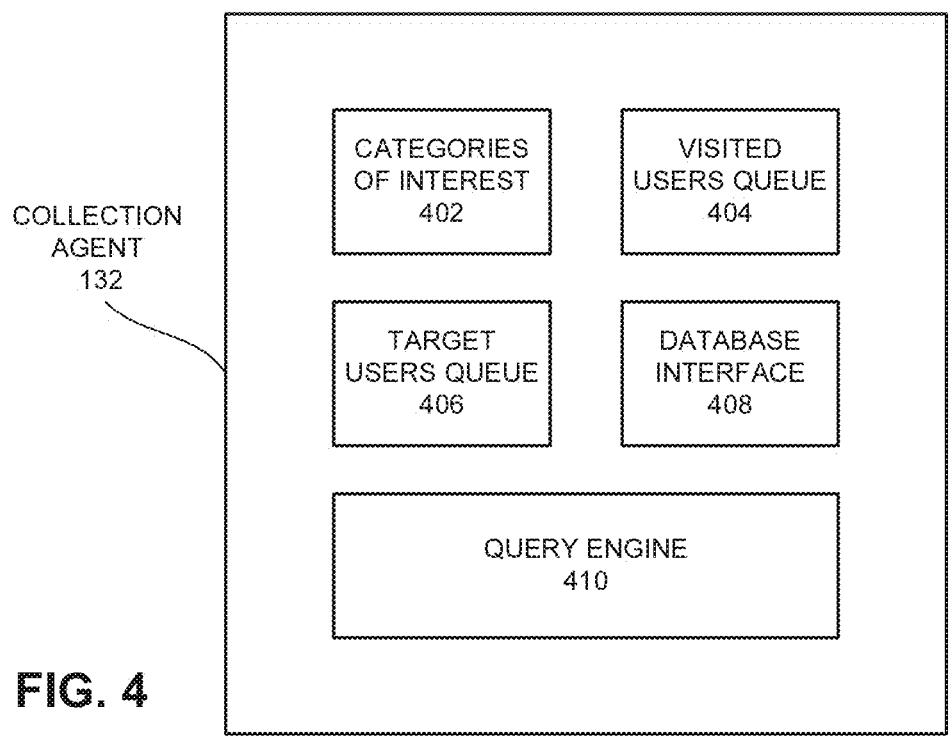
FIG. 4 is a block diagram of exemplary functional components of the collection agent of FIG. 3.

FIG. 4 is a block diagram of exemplary functional components of collection agent 304. As shown, collection agent 304 may include categories of interest 402, a visited users queue 404, a target users queue 406, a database interface 408, and a query engine 410. Depending on the implementation, collection agent 304 may include additional, fewer, different, or a different arrangement of components than those illustrated in FIG. 4.

Categories of interest 402 may include a list of categories of user's interests (e.g., topics) and information indicating possible format(s) of the information pertaining to a specific category. An exemplary list of categories of interest 402 may include "books," "movies," "events," "events," "music," "news," "gifts," "applications," "games," "places," "restaurants," etc. Depending on the implementation, categories of interest 402 may additional, fewer, or different categories, such as cooking, educational games, clothes, celebrities, or anything else that a participant in social media system 128 may share with others.

For each category, categories of interest 402 may also indicate a specific format in which data/information may be stored in social media system 128. For example, for the books category, categories of interest 402 may specify fields for an author, a title, subject matter, plot, genre, publisher, user rating (e.g., whether the user likes the book or not, etc.).

Visited users queue 404 may include a list of users about whom collection agent 304 collected/obtained data/information from social media system 128. Target users queue 406 may include a list of users about whom collection agent 304 plans to collect/obtain information from social media system 128. Depending on the implementation, visited users queue 404 and/or target users queue 406 may be implemented as a persistent queue on a database, such that if content suggestion system 132 crashes or fails, a reboot of system 132 permits restoration of visited users queue 404 and/or target users queue 406. This may allow collection agent 304 from having to revisit web pages, in social media system 128, for users whose data/information collection agent 304 already obtained.

Database interface 408 may include Structured Query Language (SQL) commands, for storing data/information, obtained from social media system 128, in a database. Similarly, database interface 08 may include a SQL commands for retrieving data/information from the database.

Query engine 410 may drive collection agent 304 to visit a web page(s) (in social media system 128) for each of the users in the target users queue 406 and collect information for each of the categories of interest 402 from the page(s). Given a member of social media system 128, for each category of interest, query engine 410 may store the data/information extracted from social media system 128 into database 310 via database interface 408. In addition, query engine 410 may obtain a list of family members or friends from a target user's page. If any of the friends/family members meet a set of criteria (e.g., input via administration device 134), query engine 410 may list the names (or identifiers) of those meeting the criteria on target users queue 406.

Figure 5:
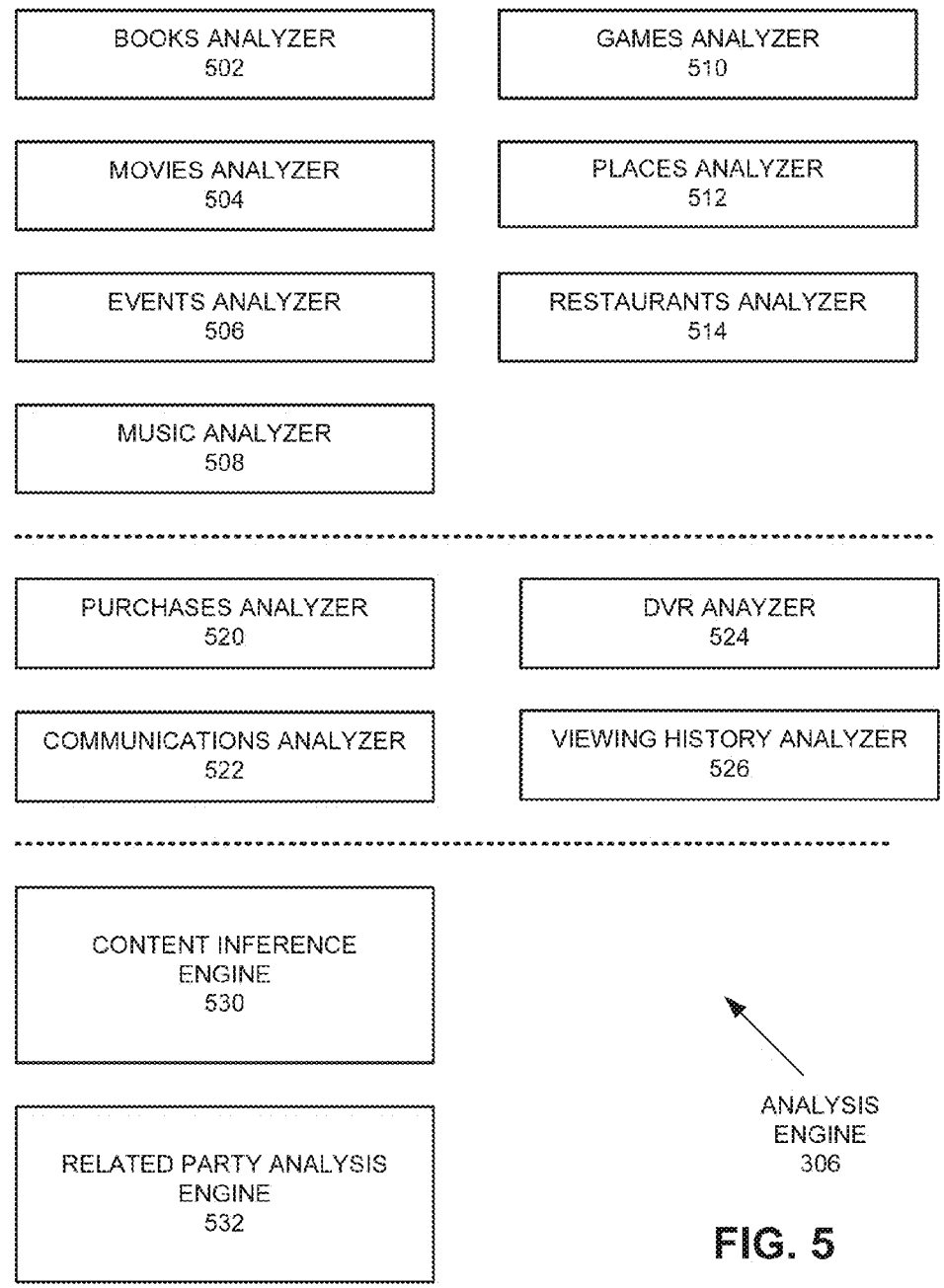
FIG. 5 is a block diagram of exemplary functional components of the analysis engine of FIG. 3.

FIG. 5 is a block diagram of exemplary functional components of analysis engine 306. As shown, analysis engine 306 may include books analyzer 502, movies analyzer 504, events analyzer 506, music analyzer 508, games analyzer 510, places analyzer 512, restaurants analyzer 514, purchase analyzer 520, communications analyzer 522, DVR analyzer 524, viewing history analyzer 526, content inference engine 530, and related party analysis engine 532. Depending on the implementation, analysis engine 306 may include additional, fewer, different, or a different arrangement of components than those illustrated in FIG. 5. For example, analysis engine 306 may include components for analyzing a user's interest in cars, houses, etc.

Books analyzer 502 may analyze a list of books that a user likes. Using the list, books analyzer 502 may obtain metadata for the books. For example, given a book's title, books analyzer 502 may obtain the name of the author, the genre/category of the book, etc. Based on the author, the genre/category, the synopsis, etc., books analyzer 502 may identify a larger body of similar works. Books analyzer 502 may then identify any television series, shows, movies, and/or content items that are based on or are related to the work.

Movie analyzer 504 may analyze a list of movies that a user likes. For each of the movies, movie analyzer 504 may identify the genre of the movie, director, actors (e.g., actors that play the main characters), plot synopsis, etc. Furthermore, based on the genre, director, actors, plot synopsis, etc., movie analyzer 504 may further identify other movies and/or television shows that share similar characteristics. In short, movie analyzer 504 infers content items in which the user may be interested in viewing, based on the movie's characteristics.

Movie analyzer 504 may generate ranking scores for the inferred list of content items. For example, the movies/shows may be scored (and ranked) based on the number of characteristics that the inferred movies/shows share with a movie identified by the user as being liked. Each characteristic may be weighted in accordance with preset values or in accordance with values set via administration device 134.

In another example, if a content item (e.g., a movie) which is inferred based on a first movie is also inferred based on a second movie, movie analyzer 504 may increase the content item's ranking score. That is, an inferred content item's ranking may depend on the number of times that the content item is inferred from different movies that the user viewed and liked.

Events analyzer 506 may identify the subject matter to which a particular event in which the user has expressed interest in social media system 128. For example, a particular event may be a rock concert, a play, a Renaissance festival, etc. For each type of event, events analyzer 506 may identify the subject matter of the event, and infer what content item relates to the subject matter. For example, if events analyzer 506 determines that an event in which the user is interested is a Renaissance fair, events analyzer 506 may identify a list of television shows/movies whose setting relates to the Renaissance period.

Music analyzer 508 may obtain metadata associated with different pieces of music that the user likes (e.g., music type (e.g., jazz, classical, rhythm and blues, rock, etc.), composer/author, vocalist, conductor, etc.). Based on the metadata, music analyzer 508 may identify content items whose metadata match the metadata. For example, music analyzer 508 may identify: a movie or television show about a particular musician; or a concert featuring a particular rock group related to a piece of music identified as being liked by the user.

Game analyzer 510, places analyzer 512, and restaurants analyzer 514 may obtain a list of games, places, and/or restaurants and identify content items whose metadata is related to the games, places, and/or the restaurants. For example, assume that a user dined at a restaurant called Rick's Café and liked the restaurant. Restaurant analyzer 514 may identify the movie Casablanca as the movie in which the name Rick's Café appears.

Purchase analyzer 520 may use data/information collected from provider network 130 and use the information to identify content items that may be related to a particular purchase. Such information may have been collected by provider network 130 when a transaction occurs via a user device (e.g., mobile device 126, computer 106, etc.). For example, assume that a user purchased multiple pieces of cookware. Based on the purchases, purchase analyzer 520 may identify television programs that are related to cooking. In another example, assume that the user purchased jewelry from Tiffany & Co. Based the information, purchase analyzer 520 may identify Breakfast at Tiffany's as a movie in which the user may be interested.

Communications analyzer 522 may scan user communications to identify content items in which the user may have interest. For example, assume that a user uses a search engine to obtain information about a particular movie. Provider network 130 may detect such communications directed to the search engine (as the query is routed through provider network 130), and provide the communications to content suggestion system 132. Communications analyzer 522 may analyze the exchanges between the search engine and the user device (e.g., mobile device 126 or a device in customer premises 102). If the analysis indicates that the communications include information about a particular movie or a television show, communications analyzer 522 may identify the movie or the show as the content item in which the user may have an interest.

DVR analyzer 524 may use data/information, collected from VSO 120, provider network 130, and/or a user device (e.g., set-top box 108), that identifies what content items have been recorded at a user device. Based on the information, DVR analyzer 524 may fetch metadata for the recorded content, and identify other content items whose metadata match the metadata for the recorded content.

Viewing history analyzer 526 may use information, from VSO 120 and provider network 130, to identify what content items a user may wish to view. For example, based on a user's viewing history, viewing history analyzer 526 may identify a first set of content items (e.g., television series, a movie, and/or a sporting event recording, etc.) that the user viewed. Viewing history analyzer 526 may then fetch metadata for the first set of content items, and identify a second set of content items whose metadata match the metadata of the first set of content items.

In addition, viewing history analyzer 526 may identify time slots (e.g., in a particular day of a week) at which the user is most likely to view a content item or a particular type of content item. For example, viewing history analyzer 526 may determine that the user likes to watch a sporting event on Monday at 9:00 p.m.

Content inference engine 530 may receive a list of content items, from books analyzer 502, movies analyzer 504, events analyzer, music analyzer 508, games analyzer 510, places analyzer 512, restaurants analyzer 514, purchase analyzer 520, communications analyzer 522, DVR analyzer 524, and/or viewing history analyzer 526, in which the user may have an interest. Content inference engine 530 may rank the content items based on at least: the number of times a particular content items is inferred by one or more analyzers; a weighting factor for each of analyzers 502-526; and time slots at which the user is most likely to watch a particular type of content item (e.g., based on information from viewing history analyzer 526).

For example, assume that weighting factors for books analyzer 502, movies analyzer 504, events analyzer 506, music analyzer 508, games analyzer 510, places analyzer 512, restaurants analyzer 514, purchase analyzer 520, communications analyzer 522, DVR analyzer 524, and viewing history analyzer 526 are: 0.2, 0.8, 0.5, 0.3, 0.3, 0.3, 0.3. 0.2, 0.6, 0.8, and 0.8, respectively. Also assume that content item #1 is identified by movies analyzer 504 and content item #2 is identified by restaurants analyzer 506 and viewing history analyzer 526. Accordingly, the weighted score for content item #1 is 0.8. The weighted score for content item #2 is 0.8+0.3=1.1. Thus, content item #2 would be ranked higher than content item #1.

In some implementations, content inference engine 530 may take into consideration a user's viewing habits/schedule. For example, assume that the user usually watches television 112 during time slots 7:00-8:00 p.m. (time slot #1), 8:00-9:00 p.m. (time slot #2), and 9:00-10:00 p.m. (time slot #3). Also, assume the order of time slots in which the user views most programs is: time slot #2, time slot #3, and time slot #1 and the corresponding weights are: 1, 0.7, and 0.3, respectively.

Continuing with the preceding example, assume that content item #1 is played 100% of time in time slot #2 and content item #2 is played 100% of time in time slot #1. For content item #1, the weighted score is then 1.0×1=1. For content item #2, the weighted score is: 0.3×1.1=0.33. Thus, by taking the user's schedule into consideration, content item #1 would be ranked higher than content item #2.

In some instances, content inference engine 530 may perform analysis to rank a list of channels. In such a case, content inference engine 530 may treat each channel as a collection of ranked content items. Thus, a channel would be ranked based on the number of ranked content items on the channel and the ranks of those content items. For example, assume that channel #1 plays content item #1 and channel #2 plays content items #1 and #2. In such an instance, channel #1 may have the score of 1 and channel #2 may have the score of 1.0+0.33=1.33. Therefore, channel #2 would be ranked higher than channel #1.

Content inference engine 530 may provide the ranked list of content items/channels to recommender 306, which, in turn, perform the actual recommendations over different communication media.

Related party analysis engine 532 may recommend a content item or a channel to a user based data/information about the user's friends, family members, and/or relatives as well as the user. For each of user's friends, relatives, and/or family members (i.e., for each member of the user's relationship tree), related party analysis engine 532 may obtain a ranked list of content items/channels. Furthermore, given the lists of contents/channels for the members of the relationship tree, related party analysis engine 532 may determine rankings of the contents/channels in the list, for the user, based on the user's relationship to the related parties that may have interest in the content items/channels.

For example, assume that a first user, John, is related to a second user, Lisa. Assume that John may like content items #3 and #4 and (e.g., score of 1 and 0.8, based on information about John alone) and Lisa may like content item #4 (e.g., score of 1, based on information about Lisa alone). Given Lisa's relationship two John, content items #1 and #2 may be re-ranked.

For example, assume a score for a content item, for John, taking others into consideration is given by: Xo=a score for a content item X for John (XJ)+k×score for content item J for Lisa (XL), where k is a constant (e.g., 0.6). Accordingly, for content item #1, Xo=1+k×0=1. For content item #2, Xo=0.8+0.6×0.8=0.8+0.48=1.28. Related party analysis engine 532 may provide the ranked list of content items/channels to recommender 308.

Figure 6:
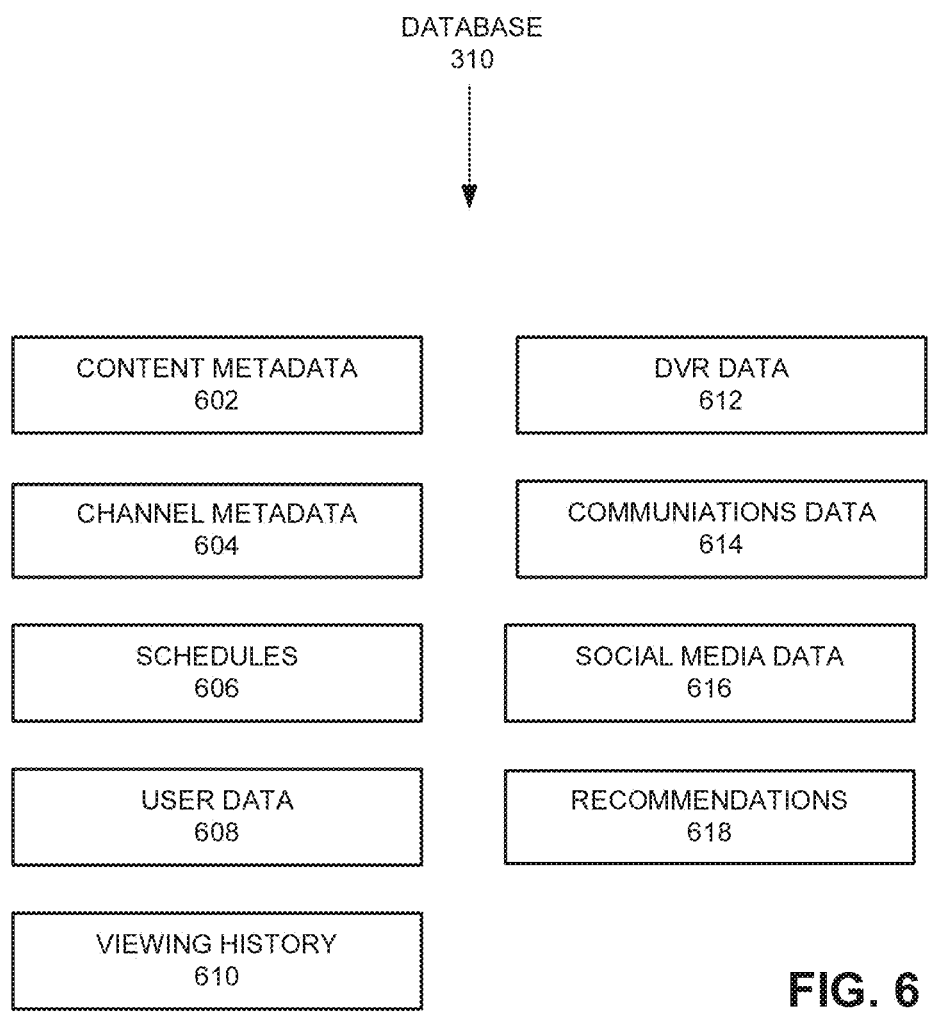
FIG. 6 is a block diagram of exemplary functional components of the database of FIG. 3.

FIG. 6 is a block diagram of exemplary functional components of database 310. As shown, database 310 may include content metadata 602, channel metadata 604, schedules 606, user data 608, viewing history 610, DVR data 612, communications data 614, social media data 616, and recommendations 618. Depending on the implementation, database 310 may include additional, fewer, or different types of data than those illustrated in FIG. 6.

Content metadata 602 may include data/information about content items. Content metadata 602 may have been obtained from a content provider. When analysis engine 306 executes processes to identify content items that a user may like, analysis engine 306 accesses content metadata 602. Content metadata 602 may include information such as a list of actors, the director, a plot synopsis, names of songs or pieces of music associated with the content item, author, genre, rating (e.g., PG-13), the year of its release, file size, etc.

Channel metadata 604 may include data/information about channels. Channel metadata 604 may have been obtained from a channel provider; or alternatively, may have been assembled based on metadata for constituent content items that on the channel. Channel metadata 604 may include, for example, what types of programs each channel includes, metadata for each programs (e.g., producer/director, actors, plot, show/movie genre, etc.).

Schedules 606 may include designated times at which specific content items may be played on specific channels. Given schedules 606, content inference engine 530 and/or related party analysis engine 532 may determine which content items are played on which channels at different times.

In addition, content inference engine 530 and/or related party analysis engine 532 may recommend channels based on schedules 606. For example, assume that there are two channels 1000 and 1500 and that analysis engine 306 has determined that a user may be interested in viewing content item #1 and content item #2. Assume that channel 1000 plays content item #1 at 6:00 p.m. and content item #2 at 2:00 p.m.; and channel 1500 plays content item #1 at 6:00 p.m. and content item #2 at 7:00 p.m. Also, assume that weighting factor is given by WF, where WF is exp(abs(usual time at which user watches shows—the time at which the program is played)). The time difference is measured in hours.

Assume that the user watches cable television between 6:00-10:00. For channel 1000, WF for content item #1=$WF_{1000,1}$=exp(abs(6:00 p.m.-6:00 p.m.))=1. For channel 1000, WF for content item #2=$WF_{1000,2}$=exp(2:00 p.m.-7:00 p.m.)=exp(-5)=0.0067. If individual scores, without accounting for scheduling for content item #1 and #2 are 0.8 and 0.3, then:

Score for channel #1=$WF_{1000,1}$×0.8_+$WF_{1000,2}$× 0.3~=0.8.

For channel 1500, WF for content item #1=$WF_{1000,i}$=exp (abs(6:00 p.m.-6:00 p.ml.))=1. For channel 1500, WF for content item #2=$WF_{1500,2}$=exp(7:00 p.m.-7:00 p.m.)=1. It follows: the score for channel #2=$WF_{1500,1}$×0.8_+$WF_{1500,2}$×0.3~=0.8+0.3=1.1. Accordingly, in this example, channel #2 would be ranked higher than channel #1.

Returning to FIG. 6, user data 608 may include data/information about user's purchase history, user account information, etc. from provider network 130. Viewing history 510 may include information that identifies content items/channels that a user viewed at specific times. DVR data 612 may include a list of content items that are recorded and stored in user devices (e.g., set-top box 108. home computer 106, mobile device 126, etc.). In some implementations, DVR data 612 may also include a history of user's recordings.

Communications data 614 may include a record of user's communications. Communications data 614 may include voice data, video data (e.g., record of video conferences), emails, text messages, etc. In some implementations, communications data 614 may be provided by social media system 128 and/or provider network 130.

Social media data 616 may include data/information obtained from social media system 128, for different categories of interest 402 for each users for whom content/channel recommendations are to be determined. These users are also members of social media system 128. In addition, social media data 616 may include data/information for each of the friends and/or relatives, of the users.

Recommendations 618 may include a ranked list of content items/channels for each of the users. Whether a recommendation is made to a user (i.e., customer) in provider network 130 and stored as recommendations 618 may depend on several factors, such as: whether the user is a subscriber to provider network 130's content service (e.g., cable, broadcast, content on demand, etc.), whether the user is interested in such recommendations, etc.

Figure 7:
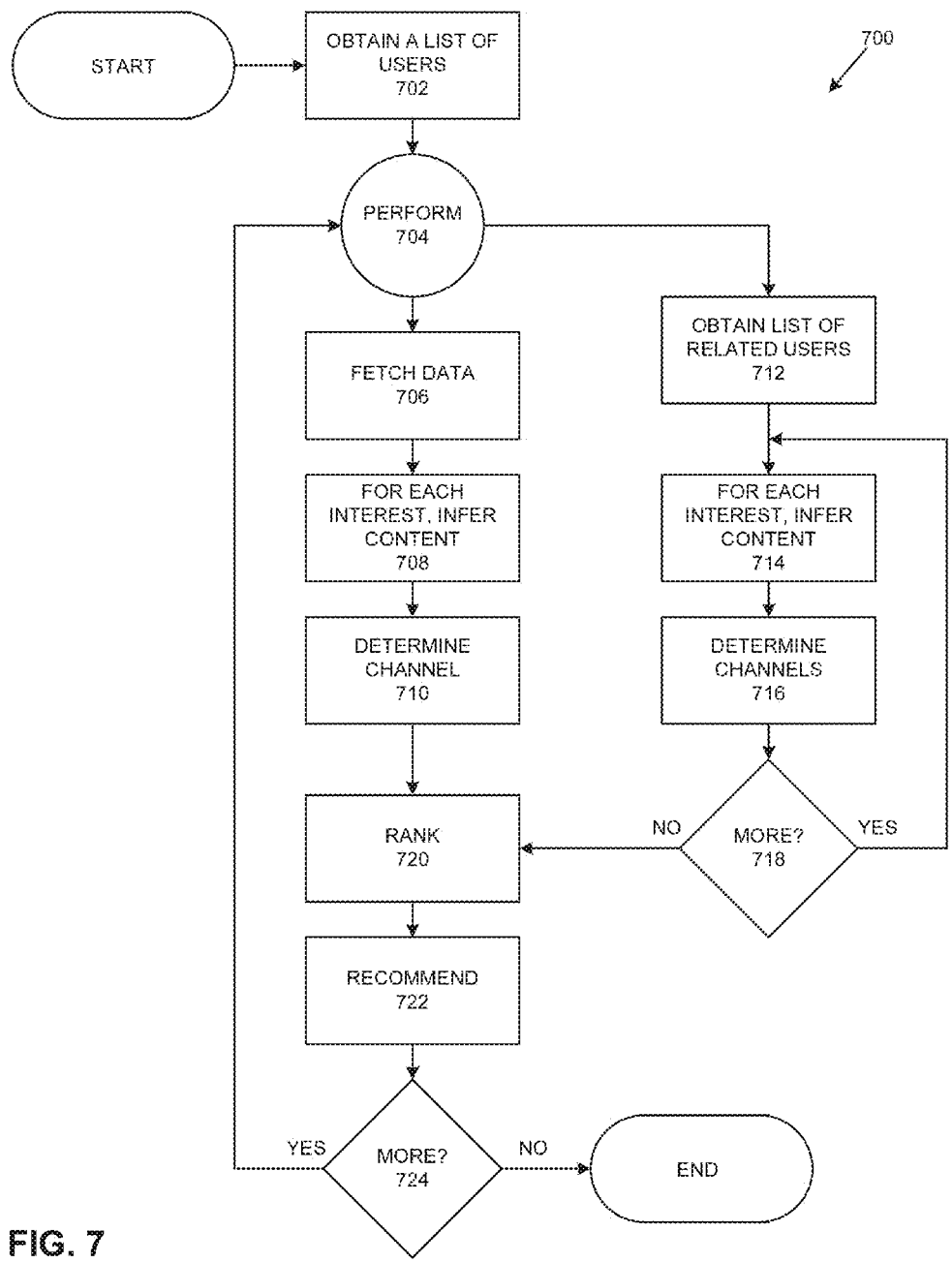
FIG. 7 is a flow diagram of an exemplary process that is associated with the content suggestion system of FIG. 1.

FIG. 7 is a flow diagram of an exemplary process 700 that is associated with content suggestion system 132. Process 700 may be performed by one or more devices in network 100. As shown, process 700 may include content suggestion system 132 obtaining a list of users for which content suggestion system 132 is to generate content/channel recommendations (block 702). For example, administration device 134 may provide the list of users (e.g., via a GUI) to system 132. Alternatively, provider network 130 may send the list of users to system 132; or system 132 may query provider network 130. In response, provider network 130 may send the list of users to content suggestion system 132.

For each of the users in the list, content suggestion system 132 may perform acts that are associated with blocks 704 through 724. For example, for each user, system 132 may fetch data pertaining to the user from database 310. As discussed above, the data may include user data 608, social media data 610, user's viewing history 610, DVR data 612, communications data 614, etc. System 132 may have collected such data via data collection engine 302 and/or one or more of collection agents 304 as discussed above.

Given the user, for each of the user's categories of interest, system 132 may infer content items in which the user may be interested (block 708). As described above with reference to FIG. 5, analysis engine 306 may analyze a list of books, movies, events, music, games, places, and/or restaurants in which the user has interest, as well as user's recent purchase history, communications, DVR recordings, user's viewing history, and/or user's viewing habit (i.e., schedule). Based on the information, analysis engine 306 may identify the list of content items, compute a score for each of the items, and rank the content items based on their scores.

Analysis engine 306 may identify channels in which some of the content items are played (or scheduled to be played), and score the channels (e.g., based on the individual scores of the content items, their scheduled times, etc.) (block 710). Once the content items and the channels have been identified, analysis engine 306 may rank the content items and/or channels based on the scores.

In some implementations, analysis engine 306 may take into account views/opinions of a user's friends and/or family members in identifying the list of content items/channels for recommendation. This is illustrated in FIG. 7 by blocks 712-718. That is, for each of the users, not only does analysis engine 306 perform acts that are associated with blocks 706-710, but also those associated with blocks 712-718.

At block 712, analysis engine 306 may obtain a list of related users. For example, given a user, analysis engine 306 may obtain the user's list of friends and family members. Furthermore, for each of the related users, analysis engine 306 may infer content items (block 714) and/or channels in which the related user may be interested, by following a procedure similar to those illustrated for blocks 704-710 (block 716). Because the related user may or may not be a member of the provider network 130, some information/data for the related user may not be available. In such instances, analysis engine 306 may identify the content items/channels based on available data/information.

At block 718, analysis engine 306 may determine whether there are additional related users. If so (block 718: yes), analysis engine 306 may return to block 714, to obtain a list of content items/channels for other related users. Otherwise (block 718: no), analysis engine 306 may proceed to block 720.

Analysis engine 706 may rank the list of content items and/or channels obtained via acts associated with blocks 706-718 (block 720) by re-calculating the scores for the content items and/or channels. For a given content item, its score may be calculated by adding a score obtained via blocks 704-710 to a re-scaled, second score that is obtained via blocks 706-718. The re-scaling may be performed accordance with the related persons' "distance" from the user.

For example, assume that John is a user of provider network 130 and a member of social media system 128. Also assume that, for John, content item #1 has the score of 1.0 (calculated at block 708), and that, for John's friend Mary, content item #1 has the score of 1.0. The total score, Ts, may be given by: Ts=user's score+coefficient (as a function of distance of a relation to the user)×the score of the content item for the relation. Thus, assuming that the coefficient for Mary is 0.4, Ts=1.0+0.4×1=1.4. Depending on the implementation, analysis engine 306 may use a different scoring scheme.

After analysis engine 306 re-scores content items identified and scored at blocks 704-718, analysis engine 306 may rank the content items and/or channels (block 720). Analysis engine 306 may recommend a number of the ranked content items/channels (e.g., top 5 items or channels). Depending on the implementation, content suggestion system 132 may provide the recommendations in many ways. For example, content suggestion system 132 may forward the recommendations to set-top box 108, which may display the list via an appropriate menu item, or electronic programming guide (EPG). Alternatively, content suggestion system 132 may send an email that includes the recommendations, or post the recommendations to social media system 128. In some instances, when a user views a program (e.g., via a set-top box 108), set-top box 108 may run an advertisement/commercial for content items/channels in the list of recommended content items/channels, giving the user an opportunity to purchase the content item (e.g., on-demand movie) or subscribe to the channel.

After providing the recommendations, content suggestion system 132 may determine whether there are additional users for which system 132 may identify content items/channels of interest. If not (block 724: no), process 700 may terminate. Otherwise (block 724: yes), process 700 may return to circle 704 to generate recommendation for lists of content items/channels for the additional users.

As described above, content suggestion system 132 may use cloud analysis, business intelligence, customer viewing history, and social media information in providing content to customers. For example, system 132 may use information provided by a social media system 128, a user's 'viewing history, and the user's downloads/recordings to identify a list of contents or channels that the user may wish to view. System 132 may present the user with the list, from which the user may select one for viewing, or from which the user may order a subset of channels for la carte programming. By identifying a list of contents/channels that may arouse the user's interest and by presenting the list to the user, system 132 may save the user from having to navigate a large number of channels and/or content items to discover channels or content items for viewing or subscription.

In some implementations, whether a recommendation is made or not may be dependent on different brackets/levels of subscription. In other implementations, a user of provider network 130 may have the option of selecting a recommendation service. If a user's level of service or the user does not warrant recommendations, entire process 700 nonetheless may still be performed. In such instances, as a result of identifying content items/channels in which the user may be interested, other systems (e.g., VSO 120 and VHO 122) may be able to select specific advertisements/commercials for promoting the content items/channels. These may be eventually pushed or sent to user devices.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to an exemplary process illustrated in FIG. 7, the order of the blocks may be modified in other implementations. In addition, non-dependent blocks may represent acts that can be performed in parallel to other blocks. Furthermore, one or more of the blocks may be omitted in other implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    receiving, at a device, a first list of users of a provider network;
    for each user in the first list of users:
        obtaining, by the device and from a database, data pertaining to the user's categories of interest, wherein the data includes a viewing history associated with the user, communications data associated with the user, and user data retrieved from a social media system;
inferring, by the device, video programs based on the data pertaining to the user's categories of interest;
determining, by the device, first scores for the video programs;
obtaining, by the device, data pertaining to a second list of users that have a relationship with the user on the social media system;
determining second scores for the video programs, wherein determining the second scores for the video programs comprises:
determining scores for the video programs for the users of the second list of users;
determining relationship scores for the users of the second list of users based on distances of relationships between the user and the users of the second list of users; and
determining the second scores for the video programs based on the first scores for the video programs, the scores for the video programs for the users of the second list of users, and the relationship scores;
inferring, by the device, a list of one or more video channels based on the video programs;
scoring, by the device, the one or more video channels based on a quantity of the video programs shown on the video channels and the second scores associated with the video programs shown on the video channels;
ranking, by the device, the list of one or more video channels based on the scores of the video channels;
determining, by the device, whether the user subscribes to a recommendation service;
transmitting, by the device and when the user subscribes to the recommendation service, the ranked list of one or more video channels to a user device associated with the user; and
transmitting, by the device and when the user does not subscribe to the recommendation service, the ranked list of one or more video channels to a second device for use in providing advertisements promoting the one or more video channels to the user.

2. The method of claim 1, wherein the data includes:
second data obtained from the provider network, wherein the second data is associated with a particular user.

3. The method of claim 2, wherein the second data includes at least one of:
the particular user's viewing history; or
a listing of the particular user's recordings of video programs.

4. The method of claim 1, wherein transmitting the ranked list to the user device includes:
forwarding the ranked list to a mobile device of the user.

5. The method of claim 4, wherein transmitting the ranked list to the user device includes:
forwarding the ranked list to a set-top box associated with the user.

6. The method of claim 1, wherein obtaining the data pertaining to the user's categories of interest includes:
obtaining the user data retrieved from the social media system via a set of application programming interfaces; or
obtaining the user data retrieved from the social media system by logging into the social media system as a user and traversing pages for the first list of users.

7. The method of claim 6, wherein traversing the pages for the first list of users includes:
obtaining the second list of users from the pages; and
traversing pages for the second list of users.

8. The method of claim 7, wherein inferring the video programs includes:
inferring second video programs based on the user's categories of interest;
inferring third video programs based on information for the categories of interest for the second list of users; and
combining a list of the second video programs and a list of the third video programs to obtain the video programs.

9. The method of claim 8, wherein scoring the one or more video channels includes:
scoring the video channels based on data pertaining to the categories of interest for the second list of users.

10. The method of claim 1, wherein determining the first scores for the video programs includes:
scoring the video programs based on the user's viewing schedule.

11. The method of claim 1, wherein determining the first scores for the video programs includes:
for each of the video programs, scoring the video program based on weighted scores for the categories of interest.

12. One or more devices comprising:
one or more network interfaces for receiving a first list of users of a provider network;
at least one processor configured to, for each user of the first list of users:
obtain, from a database, data pertaining to the user's categories of interest, wherein the data includes a viewing history associated with the user, communications data associated with the user, and user data retrieved from a social media system;
infer content items based on the data pertaining to the user's categories of interest;
determine first scores for the content items;
obtain data pertaining to a second list of users that have a relationship with the user on the social media system;
determine second scores for the content items, wherein, when determining the second scores for the content items, the at least one processor is configured to:
determine scores for the content items for the users of the second list of users;
determine relationship scores for the users of the second list of users based on a distance of relationships between the user and the users of the second list of users; and
score the content items based on the first scores for the content items, the scores for the content items for the users of the second list of users, and the relationship scores;
infer a list of one or more channels based on the scored content items;
score the one or more channels based on a quantity of the content items shown on the channels and the scores associated with the content items shown on the channels;
rank the list of one or more channels based on the scores of the one or more channels;
determine whether the user subscribes to a recommendation service;

transmit, when the user subscribes to the recommendation service, the ranked list of one or more channels to a user device associated with the user; and transmit, when the user does not subscribe to the recommendation service, the ranked list of one or more channels to a particular device for use in providing advertisements promoting the one or more channels to the user.

13. The one or more devices of claim 12, wherein the data includes:
a history of user purchases of content.

14. The one or more devices of claim 12, wherein when the at least one processor transmits the ranked list, the at least one processor is further configured to:
send a communication that recommends the ranked list.

15. The one or more devices of claim 12, wherein the data includes at least one of:
metadata about books that the user likes;
metadata about movies that the user likes;
metadata about television programs that the user likes; or
data about restaurants that the user likes.

16. The one or more devices of claim 12, wherein when the at least one processor obtains the data pertaining to the user's categories interest, the at least one processor is configured to:
obtain the user data retrieved from the social media system by invoking one or more of application programming interface calls.

17. The one or more devices of claim 12, wherein when the at least one processor determines the first scores for the content items, the at least one processor is configured to:
score the content items based on the user's viewing schedule.

18. The one or more devices of claim 12, wherein when the at least one processor determines the first scores for the content items, the at least one processor is configured to:
score each content item based on an aggregate of weighted score, for the content item, for the categories of interest.

19. One or more non-transitory computer-readable media, comprising instructions for execution by at least one processor, wherein the instructions, when executed by the at least one processor, cause the at least one processor to:
receive a first list of users of a provider network;
for each user of the first list of users:
obtain, from a database, data pertaining to the user's categories of interest from a social media system, wherein the data includes a viewing history associated with the user, communications data associated with the user, and user data retrieved from a social media system;
infer content items based on the data pertaining the user's categories of interest;
determine first scores for the content items;
obtain data pertaining to a second list of users that have a relationship with the user on the social media system;
determine second scores for the content items based on the first scores, scores for the content items for the users of the second list of users, and relationship scores for users of the second list of users, wherein the relationship scores are based on distances of relationships between the user and the users of the second list of users;
infer a list of one or more channels based on the scored content items;
score the one or more channels based on a quantity of the content items shown on the channels and the scores associated with the content items shown on the channels;
rank the list of one or more channels based on the scores of the one or more channels;
determine whether the user subscribes to a recommendation service;
transmit, when the user subscribes to the recommendation service, the ranked list of one or more channels to a user device associate with the user; and
transmit, when the user does not subscribe to the recommendation service, the ranked list of one or more channels to a particular device for use in providing advertisements promoting the one or more channels to the user.

20. The one or more non-transitory computer-readable media of claim 19, wherein when the instructions cause the at least one processor to obtain the data pertaining to the user's categories of interest, the instructions further cause the at least one processor to:
obtain the user data retrieved from the social media system by logging into the social media system as a user and traversing pages for the first list of users.

* * * * *